Oct. 24, 1950  G. ALESSANDRO  2,526,923
COOKING AND HEATING APPARATUS FOR VEHICLES
Filed Oct. 19, 1945  3 Sheets-Sheet 1
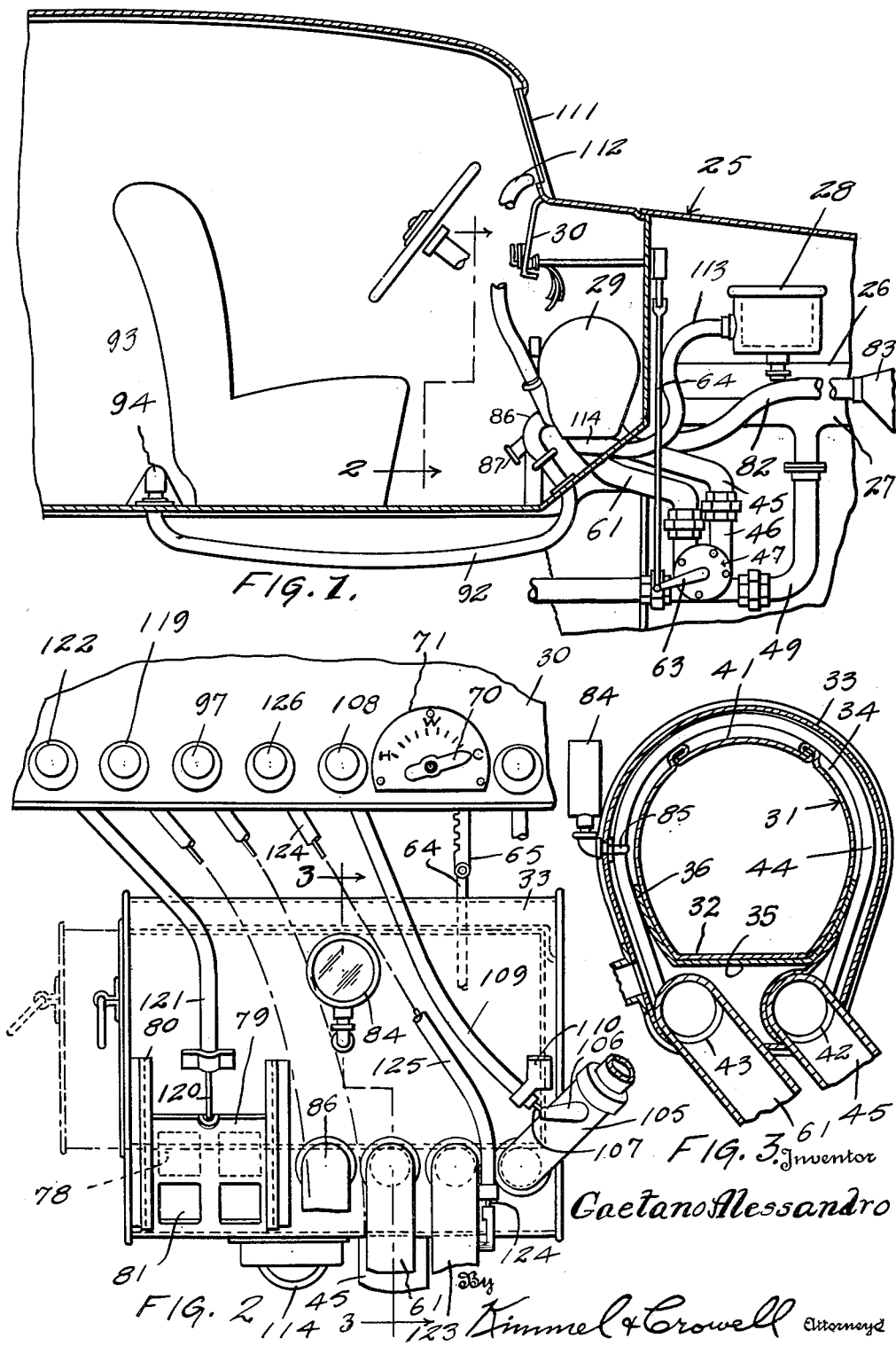
Inventor
Gaetano Alessandro
By Kimmel & Crowell Attorneys

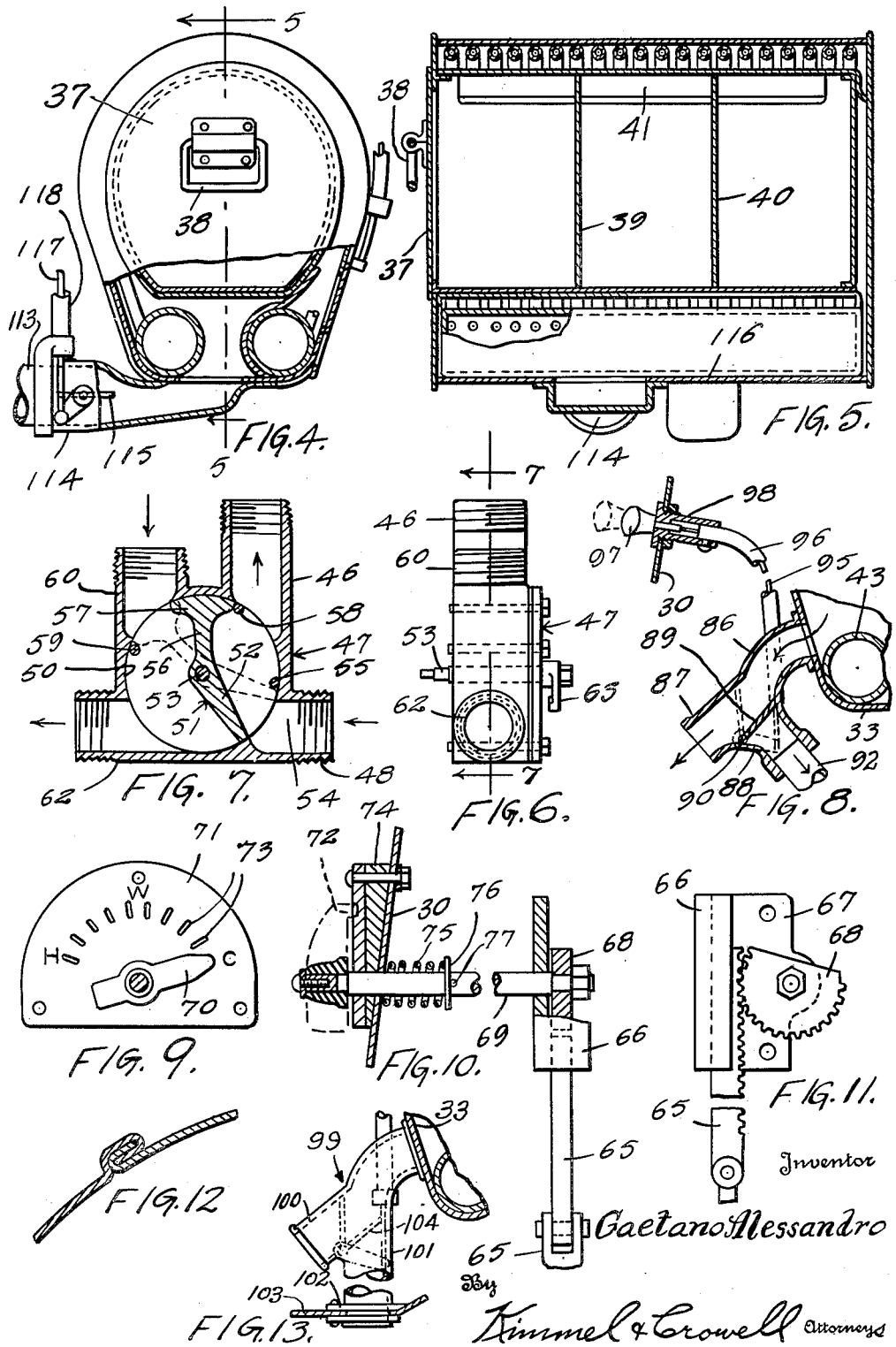

Oct. 24, 1950  G. ALESSANDRO  2,526,923
COOKING AND HEATING APPARATUS FOR VEHICLES
Filed Oct. 19, 1945  3 Sheets-Sheet 3

Inventor
Gaetano Alessandro
By
Kimmel & Crowell Attorneys

Patented Oct. 24, 1950

2,526,923

UNITED STATES PATENT OFFICE 2,526,923

COOKING AND HEATING APPARATUS FOR VEHICLES

Gaetano Alessandro, Lorain, Ohio

Application October 19, 1945, Serial No. 623,228

2 Claims. (Cl. 126—4)

This invention relates to exhaust heaters.

An object of this invention is to provide a heater for connection to the exhaust of an internal combustion engine whereby air is heated from the exhaust gases, and the heated air may be utilized for heating the interior of the vehicle, for heating the windshield to eliminate frost, or for providing heated air for the carburetor.

Another object of this invention is to provide a heater which is formed with an oven within which food articles may be placed.

A further object of this invention is to provide in a heater of this type an improved valve or damper for regulating the flow of exhaust gases through the heater, the valve being constructed to withstand the heat and other factors which render ordinary dampers impractical.

A further object of this invention is to provide a combined heater and cooker whereby articles of food may be cooked from the heat of the exhaust gases.

With the foregoing objects in view, and others which may hereinafter more fully appear, the invention consists of the novel construction, combination and arrangement of parts, as will be more specifically described, and illustrated in the accompanying drawings wherein are shown embodiments of the invention, but it is to be understood that changes, variations, and modifications may be resorted to which fall within the scope of the invention, as claimed.

In the drawings:

Figure 1 is a detailed side elevation partly broken away of a heating apparatus constructed according to an embodiment of this invention mounted in a vehicle which is shown in fragmentary sectional form;

Figure 2 is a rear elevation taken substantially on the line 2—2 of Figure 1;

Figure 3 is a sectional view taken on the line 3—3 of Figure 2;

Figure 4 is a detailed end elevation partly broken away and in section of the heater embodied in this invention;

Figure 5 is a sectional view taken on the line 5—5 of Figure 4;

Figure 6 is a detailed side elevation of the main controlling valve on the exhaust;

Figure 7 is a sectional view taken on the line 7—7 of Figure 6;

Figure 8 is a fragmentary vertical section of the outline coupling connected to the heater;

Figure 9 is a front elevation of the regulating dial;

Figure 10 is a fragmentary vertical section of the connection between the controlling dial and the main valve;

Figure 11 is a fragmentary side elevation of the operating means for the main valve;

Figure 12 is a fragmentary sectional view of the inner housing;

Figure 13 is a detailed side elevation partly broken away and in section of a modified form of the outline coupling;

Figure 14:
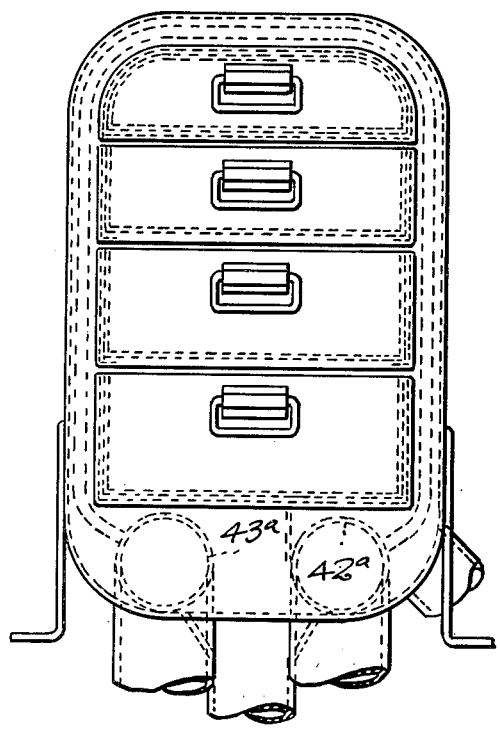
Figure 14 is a detailed end elevation of a modified form of the heater.

Referring to the drawings, and first to Figures 1 to 12 inclusive, the numeral 25 designates generally a vehicle having an internal combustion engine 26 in the forward part thereof which is provided with an exhaust manifold 27 and an intake filter 28 coupled to the carburetor. A heater generally designated as 29 is disposed within the body of the vehicle 25 at a point slightly forward from the instrument panel 30.

The reater 29 comprises an inner casing 31 which is dome shaped in transverse section and is provided with a flat bottom wall 32. A dome shaped jacket 33 engages about the inner casing 31 and is spaced therefrom so as to provide a heating chamber 34. The casing 31 is supported within the jacket 33 by means of a bottom wall 35 having upwardly curved side walls 36 which engage about the lower portions of the arcuate side walls of the casing 31. The jacket 33 has a closure 37 at one end thereof formed with a handle 38 so that articles may be positioned within the inner casing 31, the latter being removable from the jacket 33.

As shown in Figure 5, the inner casing 31 may be formed with a pair of partitions 39 and 40 dividing the interior of the casing 31 into a plurality of heating compartments and access may be had to the heating compartments in the casing 31 by means of an endwise slidable arcuate closure 41.

A pair of tubular manifolds 42 and 43 are disposed in the lower portion of the jacket 33 below the supporting wall 35 and a plurality of upwardly arched pipes 44 are connected at one end to the manifold 42 which is the intake manifold and at the opposite ends to the manifold 43 which is the exhaust or outlet manifold. The pipes 44 extend in the space 34 so that this space will be heated from the hot exhaust gases passing through the pipes 44 from the manifold 42 to the manifold 43.

The intake manifold 42 has connected to one end thereof a pipe 45 which is connected to the exhaust nipple 46 of a regulating valve structure 47 including an intake nipple 48 which is connected by means of a pipe 49 to the manifold 27. The valve structure 47 also includes a cylindrical chamber 50 within which a regulating valve or damper 51 is rotatable. The valve or damper 51 includes a tapered blade 52 which is pivotally mounted on a shaft 53 and is adapted to swing across the intake opening 54 to the chamber 50. A stop member 55 is carried by the valve structure 53 for engagement with the blade or valve member 52 so as to limit the swinging movement of the valve member in one direction.

The valve member 51 also includes an obtusely disposed extension 56 extending from the blade or valve member 52 which is formed with a valve head 57. The valve head 57 in one position of the valve structure is adapted to engage a stop member 58 disposed in the chamber 50 and in another position thereof is adapted to engage a second stop member 59. An intake nipple 60 communicates with the chamber 50 and is adapted to be connected by means of a pipe 61 to the exhaust manifold 43. An outlet nipple 62 is carried by the valve structure 47 and is disposed in alignment with the intake nipple 48.

When the valve member 51 is turned so as to direct the hot exhaust gases to the heater 29, the valve member 51 will be disposed in the full line position shown in Figure 7. When the heater 29 is cut off the valve member 51 is turned to the dotted line position shown in Figure 7. In this latter position, the head 57 will cover the inner end of the intake nipple 60 and the hot exhaust gases will pass directly from the nipple 48 to the nipple 62.

The shaft 53 has secured to one end thereof an arm 63 and the arm 63 has connected thereto one end of a link 64. The other end of the link 64 is connected to a vertically slidable gear rack 65 which is slidable in a guide 66 carried by a plate 67. A gear 68 carried by a shaft 69 measures with the rack 65 and the gear shaft 69 has secured to the inner end thereof an operating member or pointer 70. The pointer 70 is movable over a dial 71 and preferably the pointer 70 is provided with a lug 72 which is engaged in a selected one of a plurality of notches 73 carried by the dial or plate 71. In this manner the shaft 69 will be locked against movement. The dial or plate 71 is secured to the inner side of the instrument panel 30 and may be supported in vertical position by interposing a wedge 74 between the plate 71 and the inner side of the panel 30. Preferably, a spring 75 is disposed about the shaft 69 bearing at one end against the adjacent or outer side of the panel 30 and bearing at the other end against a washer 76 which is secured against movement on the shaft 69 by means of a pin 77.

The jacket 33 is provided in one side thereof with a pair of openings 78 and a slidable valve plate 79 is carried by guides 80 secured to the adjacent side of the jacket 33. The valve plate 79 is formed with a pair of openings 81 which may be moved into or out of registration with the outlet openings 78 so that heated air may be discharged into the driver's compartment for heating this compartment when heater 94 is also being used. The jacket 33 has connected to the forward side thereof the rear end of an air pipe 82 which extends forwardly and alongside of the engine 26 and has secured to the forward end thereof a scoop or funnel member 83. The scoop or funnel member 83 is disposed rearwardly of the fan of the engine 26 so that air will be forced through the pipe 82 and into air chamber 34 within the jacket 33.

A temperature gauge 84 is mounted on the inner or rear side of the jacket 33 and has a portion 85 projecting into the heating chamber 34 so that the temperature of the air in the chamber 34 can be accurately determined. The jacket 33 also has secured thereto an exhaust fitting comprising a nipple 86 which communicates with the interior of the jacket 33 and has an outlet nipple 87 communicating therewith. A second substantially right angularly disposed nipple 88 communicates with the two nipples 86 and 87 and a butterfly valve 89 is pivotally mounted as at 90 and is adapted to regulate the flow of air through either the exhaust nipple 87 or the exhaust nipple 88.

The nipple 88 has connected thereto one end of a flexible pipe 92 which extends to the rear compartment 93 of the vehicle and is connected to a rear heater 94 of conventional construction. The valve 89 has connected thereto one end of a flexible operator 95 which extends through a tubular sheath 96. The operator 95 has a knob 97 secured to the opposite end thereof and the sheath 96 is fixedly secured by means of a coupling 98 to the panel 30.

Referring now to Figure 13, there is disclosed a modified form of heated air discharge means comprising a valve housing 99 connected at one end to the jacket 33. The housing 99 includes a discharge nipple 100 for discharging the heated air into the driver compartment of the vehicle and the housing 99 includes an exhaust nipple 101 which extends vertically downwardly and is secured by means 102 to the floor 103 of the vehicle and extends through the floor so that the heated air may be discharged below the floor. A damper 104 similar to the damper 89 regulates the flow of the heated air through either a nipple 100 or 101.

The heated air in the chamber 34 may also be directed to the windshield 111 by means of a pipe 105 connected at one end to the jacket 33 and at the other end to a discharge nozzle 112. A damper 106 is mounted in the pipe 105 and is regulated by means of a flexible operating member 107 having an operating knob 108 secured to one end thereof. The sheath 109 about the flexible member 107 is fixed relative to the casing 33 by means of a bracket 110. The heated air from the jacket 33 may be also directed for discharge into the intake member 28 by means of a pipe 113 which is connected at one end to the air intake member 28.

The rear end of the pipe 113 is connected to a valve housing 114 having a damper 115 mounted therein and the valve housing 114 communicates with the interior of the casing 33 through the bottom wall 116 as shown in Figure 5. The damper 115 is adjusted by means of a flexible operator 117 which is slidable in a sheath 118 and has a knob 119 fixed to the opposite or inner end thereof. The valve plate 79 has fixed thereto a flexible operator 120 slidable in the sheath 121 and a knob 122 is fixed to the inner end of the operator 120. The pipe 113 is also connected at its rear end to a carburetor heater valve housing 123 having a damper disposed therein which is regulated by means of a flexible operating member 124 slidable in a sheath 125. A knob 126 is fixed to the rear end of the operator 124.

Figure 15:
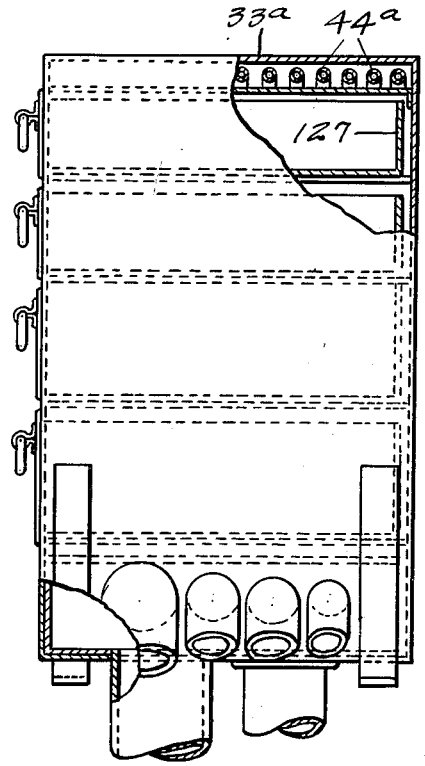
Figure 15 is a detailed front elevation partly broken away and in section of the heater shown in Figure 20.

Referring now to Figures 14 and 15, there is disclosed a modified form of the heater structure embodying an outer casing 33a which has mounted therein manifolds 42a and 43a connected to the exhaust of the engine. The casing 33a has slidable therein a plurality of drawers 127 disposed in superposed relation so that articles of food or the like may be placed in the drawers and the latter pulled outwardly as may be desired. The two manifolds 42a and 43a are connected together by means of a plurality of pipes 44a similar to the pipes 44. The remaining structure shown in Figures 1 to 12 inclusive may be incorporated with the casing shown in Figures 14 and 15.

Figure 16:
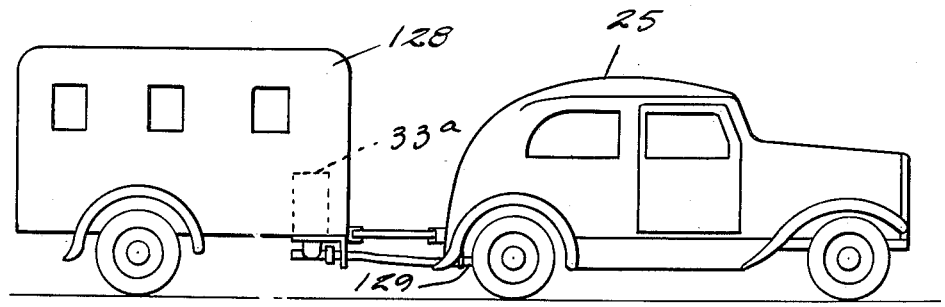
Figure 16 is a diagrammatic view showing the embodiment of this invention connected between a tractor vehicle and a trailer.
Figure 17:
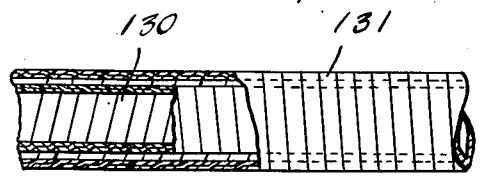
Figure 17 is a detailed side elevation partly broken away and in section of the flexible heat conducting tube for coupling the heater between the tractor and trailer.

In Figure 16 there is disclosed another adaptation of this invention wherein a trailer 128 is connected to the tractor vehicle 25. The heating member 33a is mounted in the trailer 128 and is connected to the exhaust 129 of the vehicle by means of a flexible hose 130. The flexible hose 130 is disposed interiorily of an outer flexible hose 131 which may be connected to an air intake pipe similar to the pipe 82 having a funnel or collector 83 in the forward end thereof.

In the drawings the heater and cooker is shown positioned beneath the instrument panel of the vehicle, but it will be understood that the device may be mounted beneath the engine hood or at any other suitable location.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What I claim is:

1. A combined heater and cooker comprising an outer casing, a pair of hot gas receiving manifolds in said casing and extending across the bottom thereof, arched tubes in said casing connecting said manifolds together, a support member in said casing disposed above said manifolds, an inner casing slidably carried by said support member and adapted to be encompassed by said tubes, an opening in one end of said casing through which said inner casing may be removed from and inserted into said outer casing, a closure for said opening, an air inlet formed in said outer casing, a plurality of air exhaust openings formed in said outer casing, and a valve member slidably carried by said outer casing and adapted to close said latter openings.

2. A combined heater and cooker comprising an outer casing formed with an opening in one end thereof, a pair of parallel hot gas receiving manifolds in said casing and extending longitudinally across the bottom thereof, a plurality of arched tubes having the opposite ends thereof communicating with said pair of manifolds, a support member disposed above said manifolds with the side edges thereof spaced inwardly from the sides of said outer casing, an inner casing adapted to be received by said opening for removal and insertion in said outer casing and slidably carried by said support member, said casing being formed with a longitudinally slotted top wall, a closure member slidably carried by said top wall for closure thereof, a marginal flange extending about the outer end of said inner casing and adapted to abut said one end of said outer casing for sealing the opening therein, means for supplying said outer casing with air, and valved exhaust openings formed in the side wall of said outer casing adapted to control the exhaust of heated air therefrom.

GAETANO ALESSANDRO.

REFERENCES CITED

The following references are of record in the file of this patent:

UNITED STATES PATENTS

| Number | Name | Date |
| --- | --- | --- |
| 748,493 | Fox | Dec. 29, 1903 |
| 1,062,925 | Philipcik | May 27, 1913 |
| 1,091,816 | Dudderar | Mar. 31, 1914 |
| 1,132,391 | Ruttle | Mar. 16, 1915 |
| 1,194,473 | Bovey | Aug. 15, 1916 |
| 1,213,772 | McCown | Jan. 23, 1917 |
| 1,392,956 | Martin | Oct. 11, 1921 |
| 1,525,839 | Webb | Feb. 10, 1925 |
| 1,623,963 | Frushour | Apr. 12, 1927 |
| 2,168,491 | Parmeter | Aug. 8, 1939 |
| 2,388,890 | Whitted | Nov. 13, 1945 |

FOREIGN PATENTS

| Number | Country | Date |
| --- | --- | --- |
| 617,429 | Germany | Aug. 19, 1935 |